United States Patent [19]

Matheson et al.

[11] Patent Number: 4,619,677

[45] Date of Patent: Oct. 28, 1986

[54] DISPOSABLE AIR FILTER ASSEMBLY AND METHOD OF MAKING SAME

[75] Inventors: Charles L. Matheson; Preston D. Lane; James V. Dieringer, all of Cookeville, Tenn.; Emilio Ambafz, New York, N.Y.

[73] Assignee: Cummins Engine Company, Inc., Columbus, Ind.

[21] Appl. No.: 808,877

[22] Filed: Dec. 13, 1985

[51] Int. Cl.$^4$ .............................................. B01D 35/30
[52] U.S. Cl. ...................................... 55/510; 55/337; 55/385 R; 55/459 B; 55/498; 210/304; 29/163.5 F; 264/152
[58] Field of Search ................... 55/385 R, 359, 337, 55/498, 510, 514, 459 B, 478, 480, 481; 210/304, 232; 29/163.5 F; 264/152

[56] References Cited

U.S. PATENT DOCUMENTS

| | | | |
|---|---|---|---|
| 2,068,048 | 1/1937 | Adams | 210/304 |
| 3,002,870 | 10/1961 | Belgrade et al. | 55/498 |
| 3,481,474 | 12/1969 | Paulson | 210/304 |
| 3,617,149 | 11/1971 | Gibson | 55/481 |
| 3,853,512 | 12/1974 | Hayashi | 55/459 B |
| 4,322,230 | 3/1982 | Schoen et al. | 55/498 |

FOREIGN PATENT DOCUMENTS 2739205  3/1978  Fed. Rep. of Germany ........ 55/510

*Primary Examiner*—Bernard Nozick
*Attorney, Agent, or Firm*—Neuman, Williams, Anderson & Olson

[57] ABSTRACT

A disposable air filter assembly is provided for use with, but not limited to, an internal combustion engine. The filter assembly includes a housing having a substantially spiral interior air flow passageway. The housing is of molded construction whereby the end walls thereof are initially integral with an intervening outer wall but subsequently a section of one of the end walls is severed from the remainder of the housing exposing the interior passageway. A filter member, conforming substantially to the configuration of at least a portion of the passageway is inserted therein. Subsequent to the filter member being inserted into the passageway, the separated end wall section is re-attached to the remainder of the housing. An inlet to the interior passageway is provided on the exterior of the housing whereby the air flow is in a substantially tangential direction. An outlet for the passageway downstream of the inlet is provided which communicates with the intake manifold of the engine.

8 Claims, 8 Drawing Figures

DISPOSABLE AIR FILTER ASSEMBLY AND METHOD OF MAKING SAME

BACKGROUND OF THE INVENTION

Air filter assemblies of this general type are oftentimes of complex and costly construction and are awkward to install and service.

SUMMARY OF THE INVENTION

Thus, it is an object of the invention to provide an improved air filter assembly which overcomes the aforementioned shortcomings besetting prior air filter assemblies of this general type.

It is a further object to provide a method of making an improved air filter assembly which is simple, expeditious and less costly than present known methods.

Further and additional objects will appear from the description, accompanying drawings and appended claims.

In accordance with one embodiment of the invention, an improved air filter assembly is provided which is adapted for use on but not limited to an internal combustion engine. The air filter assembly includes a molded housing having end walls and an intervening outer wall which coact to form an interior air flow passageway of substantially spiral configuration. The end walls and outer wall are molded integrally with one another. Subsequent to molding, a predetermined section of one of the end walls is severed from the remainder of the housing so as to expose the interior passageway. While the passageway is exposed, a filter member having a configuration approximating that of the passageway is inserted therein. The severed end wall section is then re-attached to the outer wall thereby retaining the filter member within the passageway. The end wall section is severed from the remainder of the housing by a bevel cut whereby the end wall section is provided with a lip which is overlapped by a lip formed on the remainder of the housing when the end wall section is re-attached to the housing. The housing is provided with an air inlet whereby the air flows into the passageway in a substantially tangential direction. An outlet is provided in the housing and is in communication with the intake manifold of the engine.

DESCRIPTION

For a more complete understanding of the invention, reference is made to drawings wherein.

Figure 5:
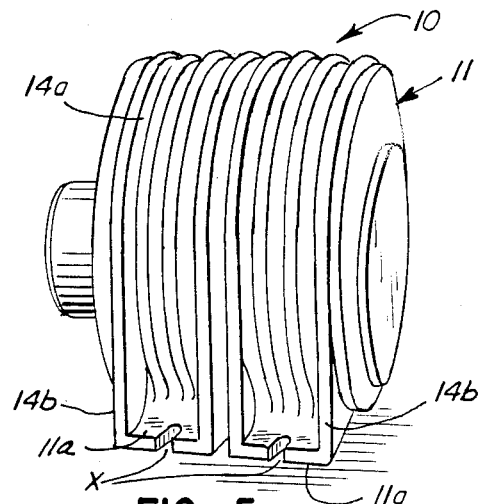
FIG. 5 is a perspective back view of the filter assembly of FIG. 1.
Figure 4:
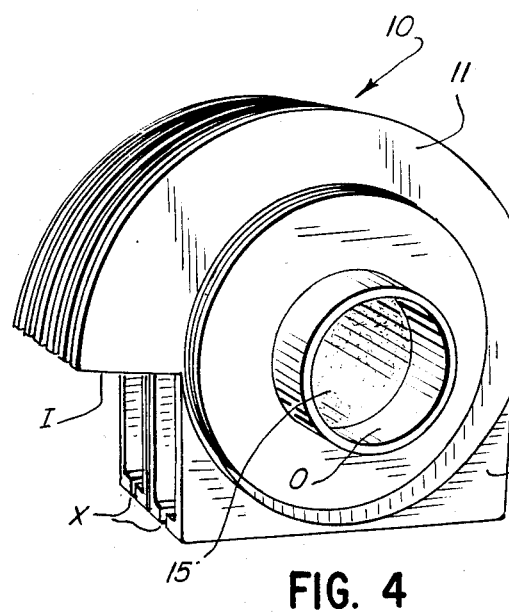
FIG. 4 is an enlarged perspective end view of the filter assembly of FIG. 1.

Referring now to the drawings and more particularly to FIGS. 4 and 5, one embodiment of the improved disposable filter assembly 10 is shown which is suitable for use on but not limited to a conventional internal combustion engine, not shown, of the type utilized in tractors, heavy duty trucks, generator sets and the like.

Prior air filter assemblies of this general type normally include a bulky and costly housing formed of thick metal which is affixed by suitable brackets adjacent the hood exterior. Disposed within the housing is a cylindrical filter element. To replace the filter element in such filter assemblies in many instances requires substantial manual effort and special tools. The improved filter assembly 10 overcomes these problems because the whole filter assembly is readily replaced with a minimum amount of effort and requires only a conventional screwdriver and/or wrench.

Basically, the improved filter assembly 10 includes a housing 11 formed so that the end walls 12 and 13 are interconnected by a curved outer wall 14. The end wall 12 has an integral cylindrical neck 12d. To add strength to the outer wall 14, there is a provided therein a plurality of curved hollow ribs 14a. The housing 11 may be formed from several materials using a variety of techniques such as spin molding, blow molding, and injection molding. The housing material should be strong, lightweight, inexpensive, durable and capable of withstanding extreme temperature and climatic variations. In a preferred form the housing is spin molded from polyethylene of the type available through Union Carbide, material No. GPEP-803. The end and outer walls coact to form an interior air flow passageway P of substantially spiral configuration. Disposed within the housing interior passageway and conforming substantially to at least a portion thereof is a filter member 15. The filter member may be formed of a variety of materials (e.g. folded perforated paper strip, non-woven glass or plastic fibers).

Figure 6:
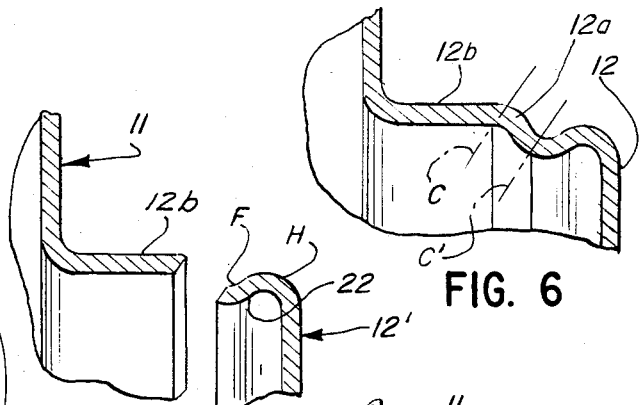
FIG. 6 is an enlarged fragmentary sectional view of the housing showing where the end wall section is to be severed therefrom; the segment of the housing which is to be removed during the severing operation is defined by phantom cut-lines.
Figure 7:
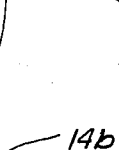
FIG. 7 is similar to FIG. 6 but showing the end wall section severed from the remainder of the housing.

As seen in FIG. 5, the lower exterior section of the housing 11 is preferably flat and is partially delimited by mounting flanges 11a which are adapted to mate with a complemental surface provided on a suitable supporting bracket, not shown. The mounting flanges 11a are provided with a plurality of reinforcing web-like ribs 14b. As aforementioned, the housing is formed so that the end and outer walls 12–14 are integral with one another. To gain access to the interior passageway of the housing, one of the end walls, preferably end wall 12, must have a section 12' thereof severed from the housing. This is accomplished by removing an annular segment 12a of the housing material from a ledge 12b formed in the end wall housing exterior, see FIGS. 6 and 7. The annular segment 12a has a substantially wedge-shaped cross-sectional configuration, as defined by the angles of cut C, C' shown in phantom lines in FIG. 6. As seen in FIGS. 6 and 7, the severed end wall section 12' is provided with a peripheral flange F which provides peripheral rigidity to the end wall section and also facilitates re-attachment of the end wall section to the remainder of the housing as will be described more fully hereinafter. It will be noted in FIGS. 6-8 that the flange F includes an annular hump H. After the end wall section 12' is severed, the ledge 12b forms an annular collar, see FIG. 7. The interior dimension of the collar and the exterior dimension of the flange hump H are such that the flange will snugly fit within the collar when the end wall section 12' is to be re-attached to the remainder of the housing, see FIG. 8.

Figure 8:
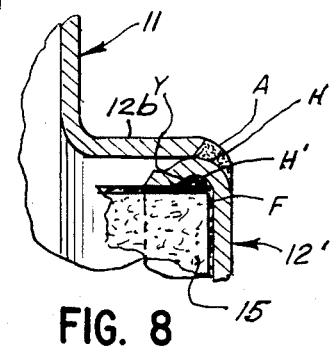
FIG. 8 is similar to FIG. 7 but showing the severed end wall section re-attached to the remainder of the housing subsequent to the filter medium having been positioned within the interior passageway of the housing.

Once the end wall section has been removed from the housing, a substantial portion of passageway P is exposed, whereby the filter member 15 may be readily positioned therein. The filter member may be formed of conventional filter material, which is capable of conforming substantially to the shape of the exposed passageway portion. The filter member is normally held in a fixed position within the passageway by an adhesive Y (e.g. urethane) which is applied to opposite side portions of the filter member. As seen in FIG. 8, a portion of the adhesive will become deposited within a pocket H' formed on the interior surface of the hump H, as will be described more fully hereinafter. The length of the filter member will depend upon the length of the exposed passageway portion.

As aforementioned, once the filter member 15 is in place, the severed end wall section 12' is re-attached to the remainder of the housing. This is accomplished by aligning the flange F with the collar 12b and then pushing the end wall section so that the flange F thereof will extend into the collar until the outer edge of the collar engages the external annular hump H, see FIG. 8. It is while the end wall section 12' is being pushed into position within the collar 12b that a portion of the adhesive Y, previously applied to the filter member exterior becomes entrapped in pocket H'. A suitable continuous bead of adhesive A (e.g. polyurethane) is then applied to the housing exterior between the exposed edge of the collar and the hump. Because of the bevel edge of the collar 12b said edge forms an exterior pocket with the adjacent exterior of the flange F in which the adhesive A is keyed in place. In lieu of the bead of adhesive, the collar edge and the exterior of hump may be fused together by the application of heat.

Either before or after the end wall section is severed from the housing, an outlet O for the passageway P is cut in the neck 12d formed in end wall section 12' and the inlet I for the passageway P is cut in the outer wall 14. A steel sleeve 20 is placed within the interior of neck 12d to facilitate clamping of an outlet conduit to the exterior of the neck without collapsing the latter.

Figure 1:
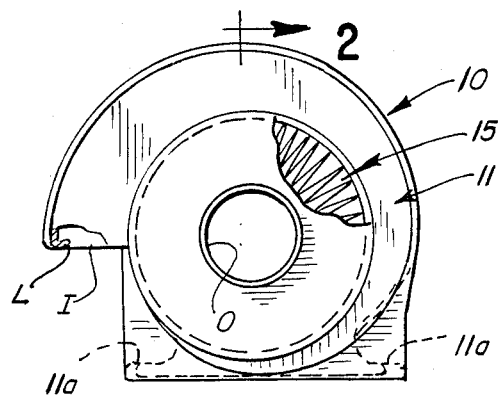
FIG. 1 is an end elevational view of one embodiment of the improved air filter assembly showing the air outlet formed therein and with a portion of the end wall removed so as to expose the filter member disposed within the housing interior passageway and with a portion of the housing removed to expose a drip rail formed at the passageway inlet.
Figure 2:
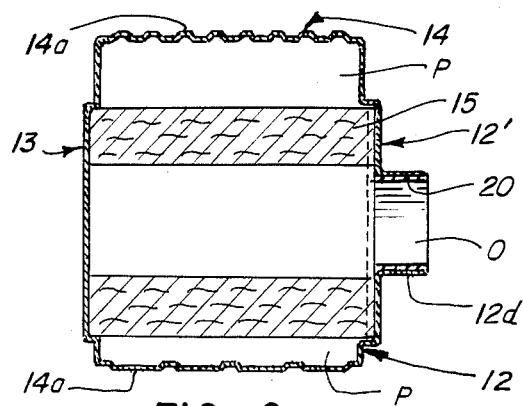
FIG. 2 is a fragmentary sectional view taken along line 2—2 of FIG. 1.
Figure 3:
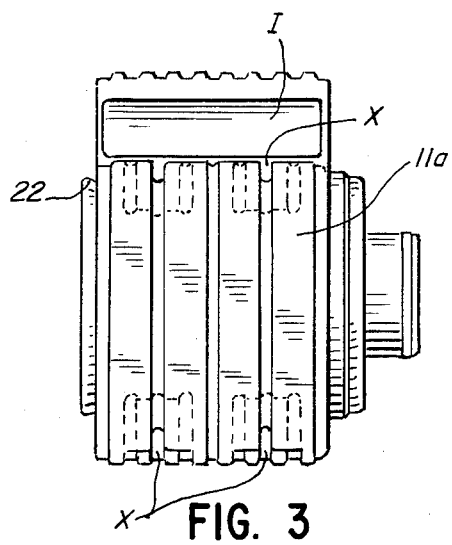
FIG. 3 is a bottom view of the housing of FIG. 1.

As seen in FIG. 1, the inlet I is provided with an inwardly and laterally extending drip rail or lip L which is adapted to temporarily collect moisture or condensate which flows downwardly on the exterior of the curved outer wall 14 forming the entry portion of the passageway P. Once a predetermined amount of moisture has collected at the drip rail, the collected moisture will then be released in the form of droplets and fall by gravity away from the inlet.

Once the filter member 15 has been permanently enclosed within the housing, the filter assembly is ready for mounting on a supporting bracket, not shown. The assembly is positioned on the supporting bracket so that the flange 11a of the housing can be secured in place by suitable anchoring bolts, not shown. The flange 11a is provided with peripheral slots X which are adapted to accommodate the shanks of the anchoring bolts.

It should be noted that the improved air filter assembly not only replaces the metal housing of prior assemblies but also much of the hardware needed to secure it in place. In particular there is no need for a "rain hat" since the scroll like construction permits the inlet I to face downwardly away from rain, snow and the like. In addition, there is no need for bulky mounting straps like in prior filter assemblies which are difficult to install.

The shape and size of the air filter assembly may vary from that shown and will depend upon the size of the engine on which it is installed and the location of the assembly relative to the engine. While the foregoing description has been directed to an internal engine, the invention herein disclosed and claimed is not intended to be limited thereto, but the improved air filter assembly may also be utilized in other applications such as a compressor.

Thus, an improved air filter assembly has been disclosed which is of simple, yet sturdy construction, and is inexpensive to manufacture. The assembly housing is of lightweight construction, and is capable of withstanding extreme temperature variations and climatic conditions.

We claim:

1. An air filter assembly for use with an internal combustion engine comprising a housing having opposed end walls and an outer wall coacting to form an interior air flow passageway, an inlet for said passageway formed on the exterior of said housing and an outlet for said passageway formed in one of said end walls for communicating with an engine manifold; and a filter member disposed within said passageway and enclosed within said housing; said end and outer walls being initially of unitary construction, one end wall having a predetermined section thereof subsequently severed from said housing so as to expose at least a portion of said interior passageway whereby said filter member is inserted into said passageway; when severing the said one end wall section from said housing, an annular segment of the housing is removed whereby a collar is formed on the exterior of the remainder of the housing and a peripheral flange is formed on the severed end wall section; the flange is sized to snugly fit within the collar when the severed end wall section is re-attached to the remainder of housing subsequent to the filter member being disposed within the passageway.

2. The air filter assembly of claim 1 wherein the housing is formed by spin-molding a durable plastic material capable of withstanding extreme temperature variations and climatic conditions.

3. The air filter assembly of claim 1 wherein the lower exterior portion of the housing is provided with a mounting flange.

4. The air filter assembly of claim 1 wherein the peripheral flange of the severed end wall section is provided with a hump spaced from a distal edge of the flange; said hump being in substantially snug engagement with an edge of the collar when the severed end wall section is re-attached to the remainder of the housing.

5. A method of forming a disposable air filter assembly for use with an internal combustion engine comprising molding a housing whereby the latter includes a pair of end walls and an intervening outer wall which coact to form an internal passageway having an inlet and an outlet; severing a predetermined section of one end wall from the remainder of the housing so that the severed end wall section is provided with an offset flange and the remainder of the housing is provided with an exterior collar, the flange and collar are sized so that at least a predetermined portion of the flange will fit within the collar, upon severing the end wall section, a substantial portion of the side of the internal passageway is exposed; inserting a filter member into the passageway through the exposed side thereof, said filter member conforming substantially to the configuration of the exposed passageway portion; and re-attaching the severed end wall section to the remainder of the housing by inserting the predetermined amount of the end wall section flange into the open end of the collar and then fixedly securing the flange to the collar so as to retain the filter member within the housing.

6. The method of claim 5 wherein the inserted flange portion of the severed end wall section is adhesively affixed to the collar.

7. The method of claim 5 wherein the inserted flange portion of the severed end wall section is affixed by fusing the inserted portion to the collar.

8. The method of claim 5 wherein at least the exterior portion of the filter member adjacent the severed end wall section has applied thereto an adhesive coating, said coating effecting adhesion of the filter member to the end wall section when the latter is re-attached to the remainder of the housing.

* * * * *